Aug. 15, 1933.                H. T. LAMBERT                 1,922,307
                                  BRAKE
                  Original Filed Jan. 25, 1928    2 Sheets-Sheet 1
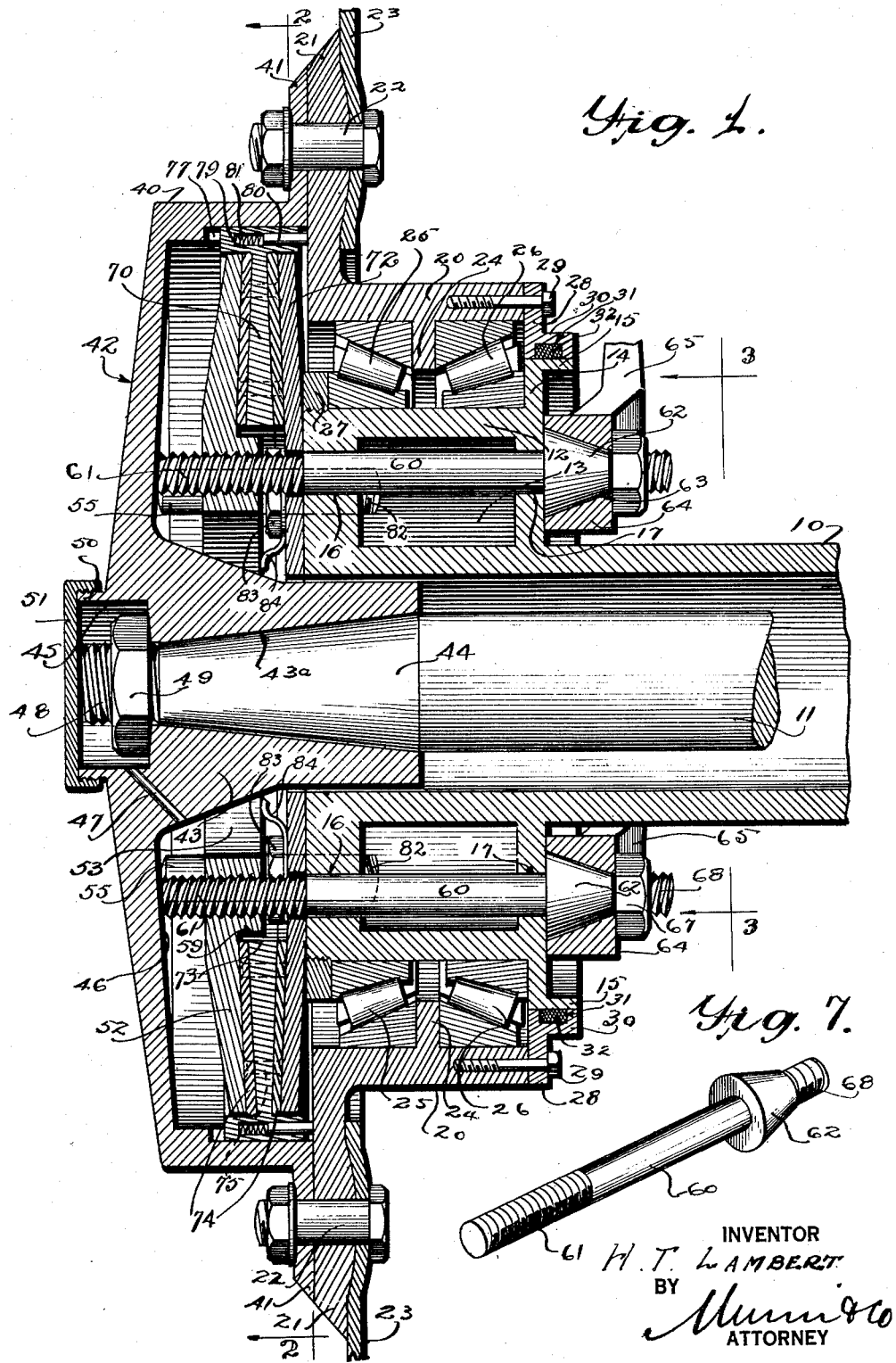
INVENTOR
H. T. LAMBERT
BY
ATTORNEY Aug. 15, 1933.  H. T. LAMBERT  1,922,307
BRAKE
Original Filed Jan. 25, 1928   2 Sheets-Sheet 2
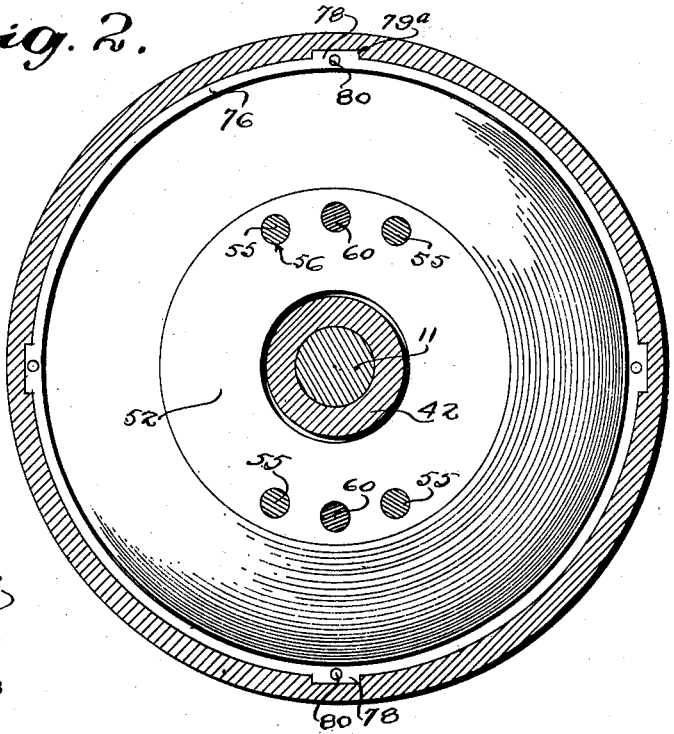
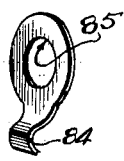
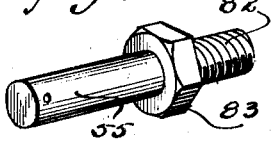
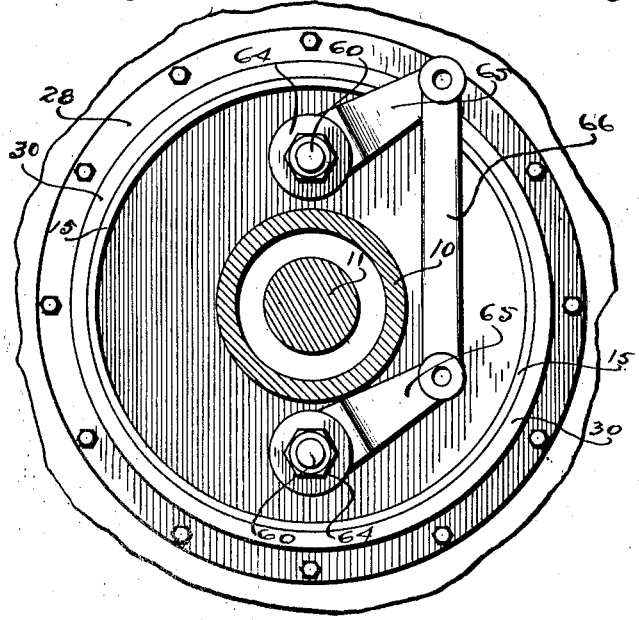
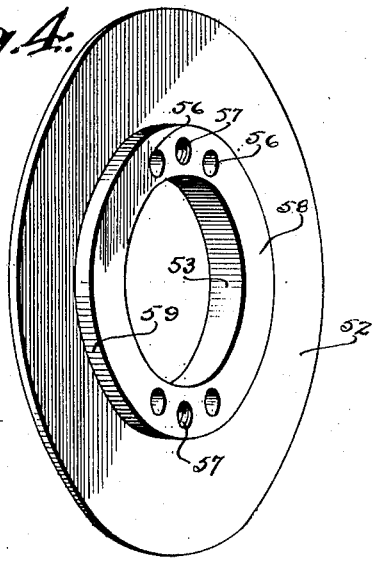
INVENTOR
H. T. LAMBERT
BY
ATTORNEY Patented Aug. 15, 1933

1,922,307

UNITED STATES PATENT OFFICE 1,922,307

BRAKE

Homer T. Lambert, Huntington, W. Va.

Application January 25, 1928, Serial No. 249,332
Renewed March 22, 1930

18 Claims. (Cl. 188—72)

This invention relates to improvements in brakes essentially of the type popularly employed on or in conjunction with automobile wheels and like power-driven apparatus, and the objects in view are increased efficiency and improved accessibility.

With these and other objects in view as will in part hereinafter become apparent and in part be stated, the invention includes braking devices and means for sustaining the same in operative relation to a wheel exteriorly of the hub of the wheel.

The invention further includes such braking devices disposed exteriorly of the wheel hub and means inward of the hub for controlling and actuating the braking devices.

In greater detail, the invention includes, in combination, a wheel hub adapted to encircle a dead axle, and braking means exteriorly of the dead axle and connected to control movements of the hub and its wheel.

In still further detail, the invention comprehends the last stated combination with means inward of the hub for controlling and actuating the braking devices.

The invention further comprises such an organization and assemblage of the said combinations as to enable the braking devices to function in a bath of lubricant.

The invention still further comprises such combinations as above recited in which the braking devices include axially shiftable and laterally frictionally engageable clutch-like disks.

The invention still further includes such combinations in which one of the members of the braking devices is connected to rotate with a live axle.

The invention also comprises the last-recited combination in which the live axle actuated brake member is interposed between the wheel and the power delivering end of the live axle.

The invention comprises certain other novel constructions, combinations, and arrangements of parts as subsequently specified and claimed.

In the accompanying drawings,—

Figure 1 is a vertical section of the hub portion of a wheel, dead and live axles, and contiguous parts having applied thereto an incorporation of an embodiment of the present invention, parts being seen in elevation.

Figure 2 is a transverse, vertical section taken on the plane indicated by line 2—2 of Figure 1, and looking in the direction indicated by the arrow, parts being seen in elevation.

Figure 3 is a similar section taken on the plane indicated by line 3—3 of Figure 1, parts being seen in elevation.

Figure 4 is a perspective view of the axially shiftable braking disk.

Figure 5 is a perspective view of one of the brake opening springs detached.

Figure 6 is a perspective view of one of the guiding studs for the disk of Figure 4, the threads being indicated conventionally.

Figure 7 is a perspective view of one of the wedge members or threaded bolts for axially shifting the disk of Figure 4, the threads being indicated conventionally.

The present invention is susceptible of a wide range of modifications in its various possible embodiments, and the exemplification selected for illustration in the drawings must be understood to involve the preferred expression of the invention when applied to a supporting or dead axle through which extends the power or live axle; and, as will become apparent, the invention is applicable to any load-carrying axle, and is essentially characterized by being located outward beyond the end of such axle, and preferably also outward beyond the outer end of the hub of the wheel sustaining such axle.

For a detailed understanding of the embodiment as illustrated in the accompanying drawings, reference is had thereto in which 10 designates the carrying axle or dead axle. Within the dead axle 10 is arranged the usual power axle 11, which is commonly adverted to as the live axle. One end portion only of the axle 10 is illustrated, but it will be understood that the other end portion and contiguous parts are duplicates of that shown and described and that the entire apparatus forms part of the rear construction or drive wheel construction of an automobile or like vehicle. The end portion of the axle 10 is provided with a boss-like enlargement 12 for receiving anti-friction bearing apparatus for the carrier wheel to be described. For the purpose of reducing weight, the boss or enlargement 12 is preferably made hollow and thus provided with an annular chamber 13. Obviously, the boss 12 may be formed integral with the main portion of the axle 10, or otherwise appropriately anchored thereto. The outer face of the boss 12 is cylindrical, and at one end the boss is provided with a radially-outstanding, circumferential flange 14 having an axially offset annular flange 15 at the outer extremity of the flange 14.

Rotatively mounted on the axle 10 is the driving wheel 23, which may be of any ordinary and well known construction, so far as the wheel proper is concerned, but the hub of the wheel is of special construction to adapt it to the conditions and to the proper cooperative relation to the other parts of the apparatus. To this end, a hub 20 is provided having a radial, peripheral flange 21 fixed to the wheel 23 by bolts 22. The hub 20 is an annular shell sufficiently larger than the cylindrical periphery of the boss 12 to surround the same and to accommodate anti-friction bearing parts therebetween. A medial, inwardly-extending flange 24 is preferably provided on the inner face of the hub shell 20 to engage and retain the adjacent parts of the anti-friction bearing members. An annular flange ring 27 is detachably fixed to the outer end of the bearing boss 12, one convenient mode of detachable attachment consisting of threading the ring 27 onto the boss, whereby between ring 27 and flange 14 is provided a trough-like, circumferential space, and lying in said space are the bearing rings or raceways of anti-friction bearings 25 and 26, the said bearings at their radially outward portions engaging similar bearings rings or raceways abutting respectively against the opposite sides of the flange 24. The bearing faces of the last-mentioned raceways are so located and inclined as to cause load stresses delivered through them and through the bearings 25 and 26 to tend to stress such raceways toward each other, and, consequently, against the flange 24, whereby the parts are held in their operative position during operation, but are susceptible of removal by the removal of the flange ring 27.

To render the area in which the bearing parts are located oil and dust-proof, a ring 28 abuts the inner end of the hub 20 and is preferably detachably fixed thereto by appropriate bolts 29 penetrating the ring 28 and threaded into the hub 20. Ring 28 extends inward to contact with the outer edge of flange 14, and at its inner portion spaced outward from flange 14 is provided with an axially-extending flange 30 turned abruptly to extend radially inward to contact with the face of the flange 15. Thus, an annular groove 31 is provided between the inner face of flange 30 and the outer face of flange 15, which groove is preferably filled with felt or other appropriate lubricant absorbent 32 for maintaining a lubricated joint or seal between the hub 20 and the bearing moss 12.

The power axle 11 is, of course, provided with the usual tapered or conical terminal portion 44 engaging a correspondingly conversely tapered or conically-bored passageway 43a in sleeve 43, which sleeve extends inwardly from a hub cap 42, which hub cap performs the customary double function of covering and closing the end of the hub and also delivering power to wheel 23 from axle 11. Hub cap 42 performs an additional function in providing anchorage for the brake mechanism, as will hereinafter be pointed out, and to facilitate provision for such function, the cap is preferably in the form of a shell having a cylindrical, peripheral portion 40 extending from the main part of the cap 42 inward to the wheel 23, and, in the instance illustrated in the drawings, extends to the flange 21 comprising a part of said wheel 23. At the inner end of the said cylindrical portion 40, the hub cap is provided with an outstanding, peripheral flange 41 in face contact with the flange 21 and penetrated by the retaining bolts 22, so that the said bolts secure the body of the wheel 23 to the flange 21 and also secure the driving hub cap 42 to the flange 21.

The axle 11 extends beyond its tapered portion 44, and is provided with a threaded terminal portion 48 engaged by a retaining nut 49 which is located to engage an outer face of hub cap 42 or outer end portion of sleeve 43 for enabling the nut 49 to draw the parts into a driving fit relation. Any appropriate retaining means, not illustrated, may be employed for preventing release of nut 49 after the same has been seated, and I preferably provide an enclosing housing for the nut 49 and threaded portion 48, which housing may be formed in any of various ways, as, for example, by providing an axial recess or pocket 45 in the central portion of the hub cap 42, which recess is of sufficient dimensions to enclose parts 48 and 49. About the pocket or recess 45, the material of the hub cap 42 is preferably axially flanged, at 50, and threaded to receive an axle cap 51. A passageway 47 intercommunicates the pocket or recess 45 with the chamber or enclosed space 46 within the hub cap 42.

Within the hub cap 42 and entirely outward of the end of the axle 10 and its bearing boss, as well as outward beyond the wheel 23 and its hub 20, a friction brake is provided, a part of which is connected to be carried either by the wheel 23 through engagement with its hub parts or by the cap 42, while the cooperating parts are carried by the supporting axle 10 with means extending inward to enable actuation and control of the brake from a position inward of the wheel 23. While such brake may be made up of any of numerous forms of braking devices, I prefer for compactness and efficiency to employ the clutch type of brake, and, to this end, is provided a clutch disk 52 within the cap 42. The part 52, while referred to as a disk, is, in fact, an annulus, since it is centrally bored, as at 53, to freely accommodate the sleeve 43 without contact therewith. The disk 52 is preferably strengthened and stiffened by the provision of an annular boss 58 surrounding the bore 53, and the boss is penetrated by guide-receiving openings 56, 56. Studs 55, each having a threaded shank 82, are threaded into the boss 12 to outstand axially therefrom and to have their smooth portions extend through the openings 56 for providing effective guides and supports for the disk 52, whereby the said disk is carried by the axle 10. A polysided portion 83 is preferably provided on each stud 55 to receive a wrench or other tool for inserting and removing the stud.

The disk 52 is thus mounted to move axially within the cap 42, and various apparatus may be employed to effect actuation thereof. One acceptable form of such apparatus consists of a pair of preferably diametrically oppositely spaced actuating wedge members 60, 60, each of said wedge members consisting of a bolt having at its outer portion a thread 61, which threaded portions are threaded through the disk 52, said disk being provided with threaded passageways 57, 57 for receiving the threaded portions 61 of said bolts 60. While the threads of the threaded portions 61 may have any of various pitches, it is preferable that a substantially high pitch be employed in order to effect an appreciable axial movement of the disk 52 with only a comparatively slight angular movement of the bolts 60, and in order to strengthen the engagement of said bolts with said disk while providing such high pitch for the threads, plural threads are preferably employed, as shown in Figure 1. The said bolts 60 extend through the boss 12, so that their inner portions extend inward beyond said boss, and the boss is provided with apertures 16 and 17 for each of said bolts 60. To the exposed, inwardly-extending portion of each bolt 60 is connected the actuator for enabling angular oscillation of the bolt, and though such actuating means is also capable of a wide range of modification, a preferred form consists in providing each of the bolts 60 at its exposed inner end portion with an integral or appropriately keyed cone 62, beyond which cone the respective bolt 60 is threaded, at 68. To each bolt 60 is fixed an operating crank arm 65, so that, when the arm is swung, the bolt is angularly advanced, or, in other words, partially rotated. Each crank arm 65 has its terminal portion 64, which engages the respective bolt 60, formed with a conical recess 63 adapted to snugly receive the cone 62, and the driving fit between the two parts provides the requisite connection for causing the bolt to move with the crank arm. A locking nut 67 engages the thread 68 of each bolt 60 and contacts with the respective crank arm 65 to force the same longitudinally of the cone 62 to a firmly seated position. The nut is preferably secured against retrograde movement in any well known manner, not illustrated. The crank arm 65 may be actuated in any preferred manner, as by connection to a draft bar or fluid-actuated piston after the manner of operation of well known forms of brakes. I preferably, however, pivotally connect the outer or free ends of the crank arms 65 by a suitable link 66, so that, when one is actuated, the other will move in exact duplication, and thus the same actuation or axial thrust is given to the disk 52 simultaneously by both bolts 60.

The disk 52 in shifting bodily axially under the actuation of the wedging threads of bolts 60 may be caused to cooperate with any appropriate rotating surface or part of or fixed to the wheel 23 to frictionally resist such rotation. A rotating part thus designed to cooperate with the disk 52 is provided in a disk 70, which, in clutch construction, is commonly referred to as a disk, but is, in fact, an annulus with a central opening 73 sufficiently large to accommodate the boss 58 of disk 52, and to remain clear of the peripheral surface 59 of said boss. The disk 70 may be anchored to the wheel 23 in any of various ways, but is preferably carried by the cap 42 and held thereby against rotary movement independently of the cap, or, in other words, the disk 70 rotates with the cap 42, and, therefore, friction between disk 52 and disk 70 provides a braking or resisting pressure to the rotation of the cap and wheel 23 and of the various parts rotating therewith. While the disk 70 may be otherwise mounted, I prefer to anchor said disk to the cap 52 in a manner to allow axial bodily travel of the disk 70 while preventing independent rotation thereof, and, to this end, the cylindrical portion 40 of cap 42 is provided at spaced intervals about its inner periphery with grooves 77 extending across said cylindrical portion 40, that is, parallel to the axis of rotation of the parts, and for each groove 77 the disk 70 is provided with a radially-extending fin 78 extending into and slidingly fitting the respective groove 77, so that the disk 70 may shift freely in an axial direction but is locked to rotate with the cap 42 and connected parts. Disk 70 is stressed axially outward by the springs 81, there being preferably one such spring for each fin or lug 78. While the peripheral portion of the disk 70 may be of any of various forms, I prefer to flange the disk laterally in both directions at its periphery to provide a T-head 76 for the disk when seen in cross section. Springs 81 may be arranged in any appropriate manner to exert their pressure in a direction for shifting disk 70 to the brake opening or brake closing position, one acceptable form being shown in the drawings and consisting of providing a pocket 79 in each of the fins or lugs 78 opening at the inner face of the disk or more accurately at the inner edge of the T-head thereof. Rather than have the springs 81 directly contact with the flange 21 or other appropriate part of the wheel, each pocket 79 is preferably provided with a plunger 80 consisting of a rod snugly but movably fitting within the respective pocket and having its end extended to engage the outer face of flange 21, the inner end of the respective plunger 80 being engaged by the respective spring 81, whereby the spring is adapted to react against the disk 70 for stressing the same axially outward.

Obviously, the disk 70 might successfully be so anchored with respect to cap 42 and wheel 23 as to be axially immovable with respect thereto, but, in that event, the braking action will depend solely on the friction between disk 52 and disk 70, and, in order to increase the braking action, the axially shiftable mounting of disk 70 is preferably provided, as just above described, and cooperating with the inner face of the disk 70 is a braking disk 72 anchored to the axle 10 by being penetrated by the threaded portions 82 of studs 55. The said studs thus serve as bolts for securing the disk 70 to the boss 12 of axle 10. Disks 52 and 72 are of substantially the same diameter as the diameter of the main portion of disk 70, falling short of the T-head portion 76 of disk 70 so as to allow requisite approach for frictional engagement of the parts. The disk 70 is preferably substantially conical in cross section for that portion of the disk inward of the T-head 76, the disk flaring inward in cross section, and being preferably lined by appropriate friction material 74 at both faces. The material 74 may, of course, be anchored to disk 70 in any appropriate manner, as by hollow rivets 75 extending through the disk and through the liners 74.

The central opening 73 of disk 70 in accommodating the boss 58 allows the boss to be engaged by cushioning means carried by and outstanding from the axle 10, and while such cushioning means may be made to take any of a variety of forms, I find a convenient arrangement to consist of the provision of leaf springs 84, 84, one for each stud bolt 55. Each leaf spring 84 is carried by an annulus having its opening 85 proportioned to receive the threaded portion 82 of the respective stud bolt 55, so that said annulus serves as a washer and also enables the hexagonal portion 83 of the respective stud 55 to clamp the parts against the disk 72 and thence against the outer end of the boss 12, whereby the leaf springs have their free end portions located to engage and stress the disk 52 axially outward. The free end portion of each leaf spring 84 is preferably curved or bent to enable the spring to appropriately engage the inner face of boss 58 for exerting the requisite, resilient stress, whereby the disk 52, whenever released, will move axially outward out of braking engagement with the disk 72, and will also move sufficiently far out to allow the disk 70 to move axially outward out of braking engagement with disk 72 under the action of springs 81. Thus, springs 81 and 84 serve normally to maintain the braking elements free for relative movement, so that disk 70 may travel with the wheel and its accompanying rotating parts, while the disks 52 and 72 remain stationary with axle 10. Of course, the disks 52 and 72 are dished slightly to correspond to and have their faces lie parallel with the faces of the disk 70 incident to its tapering or conical cross section.

The operation of the structure described is believed to be substantially apparent and may be briefly stated as follows:

Power being delivered through power axle 11, sleeve 43, cap 42, and bolts 22 to the wheel 23, rotation of the wheel and its hub 20 will continue until the power is released, as by the opening of the clutch of the vehicle, and the momentum is overcome, or the parts are stalled by the braking action. When it is desired to apply the brake, the operator of the vehicle manipulates that usual foot lever not illustrated, for swinging the crank arms 65 for rocking the bolts 60 and thereby causing their quickly-acting threads 61 to shift disk 52 into braking engagement with disk 70. When the disk 70 is mounted for axial shifting, as above described, and the disk 72 is employed, no substantial braking action will occur until disk 52 has forced disk 70 sufficiently toward disk 72 to begin braking action between disks 72 and 70, and braking action will at the same time begin in substantially the same proportion between disks 52 and 70, and the further axial advance of disk 52 will increase the braking action between the three disks as stated until the wheel 23 is stalled. Relaxation of crank arms 65 will release the several disks for moving back to the non-braking position. It will be understood, of course, that an external spring will be used on the draft bar connected to the crank arms 65 for returning them to the non-braking position when released.

What I claim is:

1. In braking mechanism, the combination, with a supporting axle and a wheel journaled thereon, of a brake for the wheel located outward beyond the end of the axle.

2. Brake mechanism as claimed in claim 1 in which the braking parts are of the clutch disk type.

3. In brake mechanism, the combination, with a supporting axle and a wheel having a hub journaled on said axle, of braking means for the wheel located outward beyond the axle and hub.

4. Brake mechanism as claimed in claim 3 in which the braking means overlies the end of the hub and axle.

5. In brake mechanism, the combination, with a supporting axle and a wheel having a hub journaled on said axle, of a cap for said hub, and braking means for the wheel outward beyond the end of the axle within said cap.

6. In brake mechanism, the combination, with a supporting axle and a wheel having a hub journaled on said axle, of a cap for said hub, and braking means for the wheel outward beyond the end of the axle within said cap, a part of the braking means being carried by the axle, and a cooperating part of the braking means being carried by the hub cap.

7. In brake mechanism, the combination, with a supporting axle, a wheel having a hub journaled on said axle, and a power axle within the supporting axle, of a cap for the hub engaging the wheel and power axle for transmitting power to the wheel, and braking means for the wheel located in said cap outward beyond the end of the supporting axle.

8. Brake mechanism as claimed in claim 7 and means inward of the wheel for actuating the braking means.

9. In brake mechanism the combination, with a supporting axle and a wheel journaled thereon, of braking means for the wheel outward beyond the end of the axle and at the outer face of the wheel, and means inward of the wheel for actuating said braking means.

10. Brake mechanism as claimed in claim 9 in which the inward actuating means is connected with the brake mechanism through a portion of the supporting axle.

11. In brake mechanism, the combination, with a supporting axle, a wheel journaled thereon, a power axle within the supporting axle, and means of connection between the power axle and wheel for delivering power to the wheel, of braking means for the wheel outward beyond the end of the supporting axle, and means extending through a portion of the supporting axle for imparting actuating movement to the braking means from a place inward of the wheel.

12. Brake mechanism as claimed in claim 11 in which the power transmission means from the power axle to the wheel encloses the braking means.

13. In brake mechanism, the combination, with a supporting axle having a terminal boss, and a wheel journaled on said boss, of braking means for the wheel outward beyond the end of the axle and beyond the boss.

14. Brake mechanism as claimed in claim 13, and means extending through the boss for transmitting actuating movement from inward of the wheel to said braking means.

15. In brake mechanism, the combination, with a supporting axle having a terminal boss, a wheel journaled on said boss, a power axle in said supporting axle, and means for transmitting movement from the power axle to the wheel, of braking means for the wheel outward beyond the end of the supporting axle and boss, and means extending through the boss for transmitting actuating movement from inward of the boss to the braking means, the power transmitting means being located to enclose said braking means.

16. In brake mechanism, the combination, with a supporting axle having a terminal bearing and a wheel having a hub journaled on said bearing, of a brake disk carried by the supporting axle, an axially movable disk spaced from the brake disk, a braking disk interposed between the axially movable disk and the first-mentioned disk, supporting studs outstanding from the supporting axle and penetrating the axially movable disk for supporting and guiding the same in its axial movement, said axially movable disk being formed with threaded apertures extending parallel to the path of its movement, threaded actuators engaging the threads of said apertures, means for rocking said actuators for moving the axially movable disk bodily toward and away from the interposed disk for clamping and releasing the latter, cushioning means stressing the axially movable disk away from a braking position, and spring-pressed plungers resiliently stressing the interposed disk toward a releasing position from braking action.

17. In brake mechanism, the combination, with a supporting axle having a bearing, and a wheel having a hub journaled on said bearing, of a braking disk fixed to the axle, an axially movable disk spaced from the braking disk, a disk interposed between the braking disk and axially movable disk, studs carried by the supporting axle, the movable disk having passageways receiving said studs for guiding and supporting the disk in its axial movement, means for moving the axially movable disk toward and from the interposed disk, the interposed disk being T-shape in cross section and having spaced radial lugs at the periphery thereof, a braking housing enclosing the disks and having slots receiving said lugs, said lugs having passages, and spring-pressed plungers in the passages tensioned to stress the interposed disk toward a brake-releasing position.

18. In braking mechanism, the combination, with a supporting axle and a wheel journaled thereon, of a brake for the wheel located outward beyond the end of the axle and beyond the wheel, and a brake drum housing for the brake carried by the wheel outward beyond and enclosing the brake.

HOMER T. LAMBERT.